United States Patent [19]
Yamaguchi et al.

[11] Patent Number: 6,153,712
[45] Date of Patent: Nov. 28, 2000

[54] THERMOPLASTIC COPOLYMER AND PROCESS FOR THE PRODUCTION THEREOF

[75] Inventors: Minoru Yamaguchi, Ibaraki; Osamu Koso; Fumioki Shimoyama, both of Himeji; Kazumi Fujioka, Ibo-gun, all of Japan

[73] Assignee: Nippon Shokubai Co., Ltd., Osaka, Japan

[21] Appl. No.: 09/011,129

[22] PCT Filed: May 30, 1997

[86] PCT No.: PCT/JP97/01846

§ 371 Date: Jan. 30, 1998

§ 102(e) Date: Jan. 30, 1998

[87] PCT Pub. No.: WO97/46600

PCT Pub. Date: Dec. 11, 1997

[30] Foreign Application Priority Data

Jun. 3, 1996 [JP] Japan ................................. 8-140233

[51] Int. Cl.[7] .......................... C08F 26/02; C08F 120/54; C08F 126/02; C08G 85/00
[52] U.S. Cl. .......................................... 526/307.1; 526/65
[58] Field of Search ...................... 526/65, 307.1

[56] References Cited

U.S. PATENT DOCUMENTS

| | | |
|---|---|---|
| 3,738,972 | 6/1973 | Moriyama et al. . |
| 4,100,126 | 7/1978 | Goldberg et al. ...................... 260/29.6 |
| 4,132,702 | 1/1979 | Schmidt et al. ........................ 260/45.8 |
| 4,659,790 | 4/1987 | Shimozato et al. . |
| 4,774,287 | 9/1988 | Shimozato et al. . |
| 5,310,831 | 5/1994 | Maeda et al. . |
| 5,478,903 | 12/1995 | Fjuioka et al. . |
| 5,489,657 | 2/1996 | Sue et al. ................................. 526/65 |
| 5,559,187 | 9/1996 | Maeda et al. . |

FOREIGN PATENT DOCUMENTS

| | | |
|---|---|---|
| 27808 | 8/1971 | Japan . |
| 46-27808 | 8/1971 | Japan . |
| 49-37590 | 10/1974 | Japan . |
| 103211 | 8/1981 | Japan . |
| 56-103211 | 8/1981 | Japan . |
| 60-258217 | 8/1981 | Japan . |
| 60-258217 | 12/1985 | Japan . |
| 296011 | 12/1986 | Japan . |
| 61-296011 | 12/1986 | Japan . |
| 161805 | 7/1987 | Japan . |
| 62-161805 | 7/1987 | Japan . |
| 162708 | 7/1988 | Japan . |
| 63 162708 | 7/1988 | Japan . |
| 6-93044 | 4/1994 | Japan . |
| 07-278232 | 10/1995 | Japan . |
| WO 90/15100 | 12/1990 | WIPO . |

*Primary Examiner*—David W. Wu
*Assistant Examiner*—Tanya Zalukaeva
*Attorney, Agent, or Firm*—Nixon & Vanderhye

[57] ABSTRACT

In manufacturing a thermoplastic copolymer by copolymerizing an aromatic vinyl monomer, a vinyl cyanide monomer, and, when necessary, a vinyl monomer (a) copolymerizable with the above two monomers, at least a part or all of the vinyl cyanide monomer is put in a reactor and copolymerizing reaction is started, and a weight of an unreacted portion of the aromatic vinyl monomer is caused to become greater than a weight of an unreacted portion of the vinyl cyanide monomer when all the monomer components are put in the reactor. By doing so, a ratio of the vinyl cyanide monomer in a structural unit of a thermoplastic copolymer produced at latter stages of the copolymerizing reaction is lowered. Thus, the present invention is capable of providing a thermoplastic copolymer which has excellent physical properties such as good heat resistance and good mechanical strength and is hard to discolor, as well as a manufacturing method thereof.

3 Claims, No Drawings

THERMOPLASTIC COPOLYMER AND PROCESS FOR THE PRODUCTION THEREOF

TECHNICAL FIELD

The present invention relates to a thermoplastic copolymer which is superior in heat resistance, mechanical strength, and other physical properties and is hard to discolor. The present invention also relates to a manufacturing method thereof.

BACKGROUND ART

Conventionally, metallic moldings used in automobiles, electric and electronic appliances, and business and office machines have been replaced with synthetic resin moldings, with a view to lightening, energy-saving, reduction of prices, and the like. Synthetic resins used for the above purposes are resins having good heat resistance and high-impact properties, for example, a polymer alloy of polycarbonate and ABS (acrylonitrile-butadiene-styrene), or modified PPE (polyphenylene ether).

On the other hand, an AS (acrylonitrile-styrene) resin is superior in chemical resistance and mechanical strength, is transparent, and has excellent compatibility with the ABS resin or the like. Therefore, the AS resin is widely used as a molding material. However, the AS resin has a defect that it is inferior in heat resistance and hence is unsuitable for the use under a high temperature. Therefore, to enhance the heat resistance of the AS resin, for example, a terpolymer using N-substituted maleimide, that is, acrylonitrile-styrene-N-substituted-maleimide, is proposed.

However, acrylonitrile is not as reactive as styrene or N-substituted maleimide. Therefore, in the case where acrylonitrile, styrene, and N-substituted maleimide are mixed at a single step so as to be copolymerized, ratios of styrene and N-substituted maleimide in a structural unit of the thermoplastic copolymer in a first half stage of the copolymerizing reaction are high, whereas a ratio of acrylonitrile in the structural unit of the thermoplastic copolymer in a latter half stage of the copolymerizing reaction is high. In other words, the composition of the thermoplastic copolymer differ in the first half stage and in the latter half stage during the copolymerizing reaction. As a result, the thermoplastic copolymer obtained has a non-uniform composition. Therefore, the thermoplastic copolymer thus obtained is inferior in heat resistance, mechanical strength, and transparency.

Then, various manufacturing methods for manufacturing a thermoplastic copolymer having a uniform composition have been proposed. For example, the Japanese Publication for Laid-open Patent Application No.3-205411/1991 (Tokukaihei No.3-205411) discloses a method wherein first, all of acrylonitrile, all of N-substituted maleimide, and a part of styrene are mixed at a time and are continuously polymerized in a solution, then, the other part of styrene is added thereto, and thereafter the mixture is let mature. The Japanese Publication for Laid-open Patent Application No.7-278232/1995 (Tokukaihei No.7-278232) discloses a method wherein emulsion polymerization is carried out by dropping an emulsion prepared by emulsifying acrylonitrile, styrene, and N-substituted maleimide. As a method for obtaining a thermoplastic copolymer superior in mechanical strength, the Japanese Publication for Laid-open Patent Application No.63-162708/1988 (Tokukaisho No.63-162708) discloses a method wherein solution polymerization is carried out by first mixing acrylonitrile and styrene at a single step and thereafter adding dropwise the N-substituted maleimide thereto.

However, satisfactory uniformity of the composition cannot be achieved by the above-described conventional methods, and hence the thermoplastic copolymer at the latter half stage of the copolymerizing reaction has a higher ratio of acrylonitrile in its structural unit. Besides, usually a thermoplastic copolymer having a higher ratio of acrylonitrile in a structural unit is easy to discolor when heated. The thermoplastic copolymer has a great difference between a degree of discoloration before the heating and that after the heating (has a great degree of re-discoloration). In other words, the thermoplastic copolymers obtained by the conventional methods have a problem that they are easy to discolor and the re-discoloration while being processed in molding cannot be restrained. Therefore, a thermoplastic copolymer which is superior in heat resistance, mechanical strength, and other physical properties and is hard to discolor is earnestly sought for, along with a method for manufacturing the same.

The present invention was made in light with the above-described problems, and the object of the present invention is (1) to provide a thermoplastic copolymer which is superior in heat resistance, mechanical strength, and other physical properties, and is hard to discolor, and (2) to provide a method for manufacturing the same.

DISCLOSURE OF THE INVENTION

The inventors eagerly studied thermoplastic copolymers and manufacturing methods thereof, in order to achieve the above object. As a result, it was found that: when a thermoplastic copolymer is manufactured by copolymerizing monomer components including an aromatic vinyl monomer and a vinyl cyanide monomer, by (i) putting at least a part or all of the vinyl cyanide monomer among the monomer components into a reactor before a copolymerizing reaction starts, and (ii) causing a weight of an unreacted portion of the aromatic vinyl monomer in a reactive solution to become greater than a weight of an unreacted portion of the vinyl cyanide monomer therein when all the monomer components are in the reactor, a ratio of the unreacted portion of the aromatic vinyl monomer in the reactive solution can be made higher than a ratio of the unreacted vinyl cyanide monomer therein, thereby resulting in that a ratio of the vinyl cyanide monomer in a structural unit of a thermoplastic copolymer at a latter half stage of the copolymerizing reaction can be lowered.

Besides, by the above-described method, discoloration on heat application (thermal discoloration) can be suppressed, and a difference between degrees of discoloration before and after the heat application (degree of re-discoloration) can be decreased. In other words, finding that by the above method, a thermoplastic copolymer which has excellent physical properties such as good heat resistance and good mechanical strength and which is hard to discolor can be obtained, the inventors successfully achieved the invention.

Therefore, to achieve the aforementioned object, the method of the present invention for manufacturing a thermoplastic copolymer is a method for manufacturing a thermoplastic copolymer by copolymerizing monomer components including an aromatic vinyl monomer and a vinyl cyanide monomer, which is characterized in comprising the steps of (i) putting at least a part or all of the vinyl cyanide monomer among the monomer components into a reactor before a copolymerizing reaction starts and (ii) causing a weight of an unreacted portion of the aromatic vinyl monomer in a reactive solution to become greater than a weight of an unreacted portion of the vinyl cyanide monomer therein when all the monomer components are put into the reactor.

Besides, another method of the present invention for manufacturing a thermoplastic copolymer is a method for manufacturing a thermoplastic copolymer by copolymerizing monomer components including an aromatic vinyl monomer and a vinyl cyanide monomer, which is characterized in comprising the steps of (i) putting at least a part or all of the vinyl cyanide monomer among the monomer components into a reactor before a copolymerizing reaction starts, and (ii) finishing addition of the aromatic vinyl monomer to a reactive solution after addition of the vinyl cyanide monomer is finished.

Furthermore, still another method of the present invention for manufacturing a thermoplastic copolymer is a method for manufacturing a thermoplastic copolymer by copolymerizing monomer components including an aromatic vinyl monomer and a vinyl cyanide monomer, which is characterized in comprising the steps of (i) putting at least a part or all of the vinyl cyanide monomer among the monomer components into a reactor before a copolymerizing reaction starts, (ii) adding a rest of the monomer components to the reactive solution after the copolymerizing reaction started, and (iii) removing an unreacted portion of the vinyl cyanide monomer from the reactive solution.

By the foregoing methods, it is possible to suppress the discoloration as well as to decrease a difference between degrees of discoloration before and after heat application (degree of re-discoloration). By doing so, it is possible to obtain a thermoplastic copolymer which has various excellent physical properties including good heat resistance, good mechanical strength, and good resistance against discoloration. In other words, it is possible to obtain a thermoplastic copolymer which has various excellent physical properties including good heat resistance, good mechanical strength, which is hard to discolor, and which exhibits a low degree of re-discoloration when processed in molding.

Furthermore, to achieve the above object, a thermoplastic copolymer of the present invention is characterized in containing a residual group of an aromatic vinyl monomer in a range of 5 weight percent to 85 weight percent, a residual group of a vinyl cyanide monomer in a range of 5 weight percent to 35 weight percent, a residual group of an unsaturated dicarboxylic acid derivative in a range of 10 weight percent to 50 weight percent, and a residual group of a vinyl monomer (b) copolymerizable with the above three monomers in a range of 0 weight percent to 20 weight percent, the thermoplastic copolymer satisfies:

$YI_1 < (1.5 \times X^2/100) + 5;$ and $YI_2/YI_1 < 1.5$ where $YI_1$ is a yellowness index of a 15 weight percent chloroform solution of the thermoplastic copolymer, $YI_2$ is a yellowness index of a 15 weight percent chloroform solution of the thermoplastic copolymer resulting on heat application at 265° C. for four minuets, and X is a weight percent of the residual group of the unsaturated dicarboxylic acid derivative.

In addition, to achieve the aforementioned object, the above thermoplastic copolymer of the present invention is further characterized in that a ratio of low-molecular-weight components containing the residual group of the unsaturated dicarboxylic acid derivative is not more than $(0.1 \times X)$.

The above-described thermoplastic copolymer have various excellent physical properties including good heat resistance and good mechanical strength, and is hard to discolor, while re-discoloration thereof when processed in molding can be suppressed. In the case where the ratio of the low-molecular-weight components is not higher than $(0.1 \times X)$, this condition causes the thermoplastic copolymer to become further superior in heat resistance and mechanical strength, in addition to various other effects.

The following description will explain the present invention in detail.

A manufacturing method of a thermoplastic copolymer in accordance with the present invention is a method of copolymerizing monomer components including an aromatic vinyl monomer, a vinyl cyanide monomer, and, when necessary, a vinyl monomer (a) copolymerizable with these monomers. The vinyl monomer (a) includes at least one of an unsaturated dicarboxylic acid derivative and a vinyl monomer (b), the vinyl monomer (b) being copolymerizable with the above-described three monomers (namely, the aromatic vinyl monomer, the vinyl cyanide monomer, and the unsaturated dicarboxylic acid derivative).

Examples of the aromatic vinyl monomer include styrene, o-methylstyrene, m-methylstyrene, p-methylstyrene, α-methylstyrene, α-ethylstyrene, α-methylmethylstyrene, dimethylstyrene, t-butylstyrene, chlorostyrene, dichlorostyrene, buromostyrene, diburomostyrene, vinylnaphthalene, etc. One of these aromatic vinyl monomers may be used, or a combination of a plurality of them may be used. Among the aforementioned compounds, styrene, or α-methylstyrene, is preferable.

No particular limitation is on a ratio of the aromatic vinyl monomer in a sum of the aromatic vinyl monomer, the vinyl cyanide monomer, and the vinyl monomer (a), that is, all the monomer components (the sum of the three is hereinafter referred to as "all the monomer components"). However, it is preferable that the aromatic vinyl monomer accounts for 15 weight percent to 95 percent, and more preferably, 25 weight percent to 75 weight percent. If the ratio of the aromatic vinyl monomer is less than 15 weight percent, conversion of polymerization lowers, thereby causing an obtained thermoplastic copolymer to have lower mechanical strength. If the ratio of the aromatic vinyl monomer exceeds 95 weight percent, a thermoplastic copolymer obtained has lower heat resistance.

Examples of the vinyl cyanide monomer include acrylonitrile, methacrylonitrile, etc. A single type of the vinyl cyanide monomer may be used, or a combination of two or more may be used. Among the aforementioned examples, acrylonitrile is preferable.

There is no particular limitation on a ratio of the vinyl cyanide monomer in all the monomer components. But, it is preferable that the vinyl cyanide monomer accounts for 5 weight percent to 35 weight percent, and more preferably, 5 weight percent to 25 weight percent. If the ratio of the vinyl cyanide monomer is less than 5 weight percent, mechanical strength, such as high-impact properties, of a thermoplastic copolymer obtained lowers. If the ratio of the vinyl cyanide monomer exceeds 35 weight percent, a thermoplastic copolymer obtained has lower heat resistance, and becomes easier to discolor.

Examples of the unsaturated dicarboxylic acid derivative include: maleimide series monomers such as maleimide; N-substituted maleimide such as N-methyl maleimide, N-ethyl maleimide, N-n-propyl maleimide, N-isopropyl maleimide, N-butyl maleimide, N-phenyl maleimide, N-cyclohexyl maleimide, N-(chlorophenyl)maleimide, and N-(bromophenyl)maleimide; and unsaturated dicarboxylic acid such as maleic anhydride; etc. A single type of these unsaturated dicarboxylic acid derivatives may be used, or a combination of a plurality of them may be used. Among the compounds mentioned above, N-phenyl maleimide and N-cyclohexyl maleimide is preferable, from a viewpoint of easy availability and economization.

A ratio of the unsaturated dicarboxylic acid derivative in all the monomer components is not particularly limited. However, it is preferable that the ratio is not more than 50 weight percent, and more preferably, 20 weight percent to 50 weight percent. If the ratio of the unsaturated dicarboxylic acid derivative exceeds 50 weight percent, flowability lowers, and mechanical strength such as high-impact properties as well as processibility of a thermoplastic copolymer obtained lowers. Besides, the thermoplastic copolymer is easy to discolor. Note that in the case where the unsaturated dicarboxylic acid derivative is not used, a thermoplastic copolymer might have a lower heat resistance.

Examples of the vinyl monomer (b) include: acrylic acid; methacrylic acid; alkyl acrylate such as methyl acrylate, ethyl acrylate, propyl acrylate, butyl acrylate, and 2-ethylhexyl acrylate; alkyl methacrylate such as methyl methacrylate, ethyl methacrylate, propyl methacrylate, butyl methacrylate, and 2-ethylhexyl methacrylate; allyl acrylate such as benzyl acrylate; and allyl ester methacrylate such as benzyl methacrylate; etc. As the vinyl monomer (b), one of them may be used, or a combination of two or more of them may be used.

No particular limitation is on a ratio of the vinyl monomer (b) in all the monomer components. However, it is preferable that the ratio is not more than 20 weight percent, and more preferably, not more than 10 weight percent. If the ratio of the vinyl monomer (b) exceeds 20 weight percent, heat resistance and mechanical strength such as high-impact properties of a thermoplastic copolymer obtained drop.

Note that since the vinyl monomer (a) includes at least either the unsaturated dicarboxylic acid derivative or the vinyl monomer (b), the vinyl monomer (a) preferably accounts for not more than 50 weight percent, and more preferably, 20 weight percent to 50 weight percent. Besides, it is preferable that the vinyl monomer (a) includes the unsaturated dicarboxylic acid derivative.

By the manufacturing method of the present invention, the monomer components are copolymerized by a batch method, wherein the solution copolymerization is preferably carried out. In the case of such solution copolymerization, a solvent and a polymerization initiator are utilized.

Examples of the solvent include: a saturated hydrocarbon such as hexane, heptane, octane, and cyclohexane; an alcohol such as butyl-alcohol, heptyl-alcohol, metyl-alcohol, octyl-alcohol, nonyl-alcohol, and decyl-alcohol; a ketone such as methyl ethyl ketone; an ether such as tetrahydrofuran; an aromatic hydrocarbon such as benzene, toluene, xylene, and ethylbenzene; and, hydrocarbon halide such as carbon tetrachloride; etc. One of these solvents may be used, or, two or more of them may be appropriately mixed and used. Among the above-mentioned compounds, the aromatic hydrocarbon is preferable. Note that an amount of the solvent should be appropriately determined in accordance with a combination of the monomers, reaction conditions, and the like, and should not be specifically limited.

Examples of the polymerization initiator include radical polymerization initiators which include: organic peroxide such as cumene hydroperoxide, di-isopropylbenzene hydroperoxide, di-t-butyl peroxide, p-menthane hydroperoxide, lauroyl peroxide, benzoyl peroxide, t-butyl peroxy-isopropyl carbonate, 1,1-bis(t-butyl-peroxy)-3, and 3,5-trimethyl-cyclohexane; inorganic peroxide such as ammonium persulfate, potassium persulfate, sodium persulfate, and hydrogen peroxide; and, azo compounds such as 2,2-azobisisobutyronitrile. One of the polymerization initiators may be used, or a combination of two or more may be used. Besides, a redox initiator may be used, which is obtained by combining (1) the above-mentioned peroxide and (2) a reducing agent, for example, sulfite, bisulfite, thiosulfate, formamidine sulfinic acid, or ascorbic acid. Note that an amount of the polymerization initiator should be appropriately determined in accordance with a combination of the monomers, reaction conditions, and the like, and should not be specifically limited.

According to the manufacturing method of the present invention, a part of all the monomer components, the part including at least a part or all of the vinyl cyanide monomer (this part is hereinafter referred to as monomer components (i)), is put in a prepared reactor equipped with an agitator and the like. Thereafter, the copolymerizing reaction is initiated. In order to enhance the uniformity of the composition, the copolymerizing reaction is preferably started after monomer components including at least a part of the aromatic vinyl monomer and a part or all of the vinyl cyanide monomer are put in the reactor.

The total amount of the solvent and the polymerization initiator may be put in the reactor beforehand. Alternatively, a part thereof may be put in the reactor beforehand, and the other may be mixed in the rest of the monomer components (hereinafter referred to as monomer components (ii)) to be added to the reacting solution after the copolymerizing reaction starts. In other words, there is no specific limitation on how the solvent and the polymerization initiator are put into the reactor. Note that at least a part of the polymerization initiator should be put in the reactor before the monomer components (ii) are added to the reactive solution.

A reaction temperature is not particularly limited, but 70° C. to 180° C. is preferable, and 90° C. to 160° C. is more preferable. The reaction time is appropriately set in accordance with reaction conditions such as the reaction temperature, a period of time spent for adding the monomer components (ii), and the like, and hence no particular limitation is on it.

After the copolymerizing reaction started, when all the monomer components are in the reactor, some measures are taken so that in the reactive solution a weight of an unreacted portion of the aromatic vinyl monomer becomes greater than a weight of an unreacted portion of the vinyl cyanide monomer. To be more specific, for example, the monomer components (ii) is added to the reactive solution in a manner such that in the solution the weight of the unreacted portion of the aromatic vinyl monomer becomes greater than the weight of the unreacted portion of the vinyl cyanide monomer. Another alternative is more preferable wherein the monomer components (ii) is added to the reactive solution in a manner such that in the solution the weight of the unreacted portion of the aromatic vinyl monomer becomes greater than a weight of the unreacted monomers other than the aromatic vinyl monomer, that is, a total weight of the unreacted portion of the vinyl cyanide monomer and the unreacted portion of the vinyl monomer (a) when all the monomer components are in the reactor.

In other words, a certain measure is taken so that in the reactive solution the weight of the unreacted aromatic vinyl monomer becomes greater than that of the unreacted vinyl cyanide monomer when putting the monomer components (ii) into the reactor is finished. Furthermore, it is more preferable that the weight of the unreacted aromatic vinyl monomer is made greater than the total weight of the unreacted vinyl cyanide monomer and the unreacted vinyl monomer (a) when putting the monomer components (ii) into the reactor is finished. In addition, it is further preferable that a ratio of the unreacted aromatic vinyl monomer in all the unreacted monomers in the reactive solution is not less than 60 weight percent when putting the monomer components (ii) into the reactor is finished. Note that a yield of the thermoplastic copolymer should be preferably not less than 50 percent, and more preferably not less than 70 weight percent, from a viewpoint of productivity.

With this, in a latter stage of the copolymerizing reaction, the ratio of the unreacted aromatic vinyl monomers in the reactive solution can be made higher than the ratio of the unreacted vinyl cyanide monomer, thereby lowering the ratio of the vinyl cyanide monomers in a structural unit of the thermoplastic copolymer produced in the latter stage of the copolymerizing reaction.

Furthermore, it is preferable that throughout the process of the copolymerizing reaction, the weight of the unreacted aromatic vinyl monomer is greater than the weight of the unreacted vinyl cyanide monomer in the reacting solution. It is particularly preferable that throughout the copolymerization process, the weight of the unreacted aromatic vinyl monomer is greater than the total weight of the unreacted vinyl cyanide monomer and the unreacted vinyl monomer (a) in the reactive solution.

As a method for adding the monomer components (ii) to the reactive solution, there are, for example, a continuous adding method and a method wherein the monomer components (ii) are divided into several groups and are sequentially added to the solution. The former method is preferable. Note that a period of time spent for addition of the monomer components (ii) is not particularly limited. Besides, the addition of the monomer components (ii) to the reactive solution may be started at any time as long as it is after the copolymerizing reaction is started. Thus, there is no particular limitation on the timing thereof, but it is desirable that the addition is started as early as possible.

when the monomer components (ii) including the rest of the aromatic vinyl monomer, a part or all of the vinyl monomer (a), and the rest of the vinyl cyanide monomer (in the case where not all the vinyl cyanide monomer was included in the monomer components (i)) are added, the aromatic vinyl monomer, the vinyl monomer (a), and the vinyl cyanide monomer may be separately added, or alternatively, may be mixed and added. It should be noted that it is preferable that the aromatic vinyl monomer and the vinyl cyanide monomer are separately added. In this case, the vinyl monomer (a) may be separately added, or alternatively, may be mixed with the aromatic vinyl monomer and added, or may be mixed with the vinyl cyanide monomer and added. Besides, in the case where the vinyl monomer (a) includes the unsaturated dicarboxylic acid derivative and the vinyl monomer (b), the unsaturated dicarboxylic acid derivative and the vinyl monomer (b) may be separately added.

In the case where the vinyl monomer (a) includes the unsaturated dicarboxylic acid derivative, that is, in the case where the monomer components (ii) include the aromatic vinyl monomer and the unsaturated dicarboxylic acid derivative, it is preferable that the aromatic vinyl monomer and the unsaturated dicarboxylic acid derivative are separately added, without being mixed with each other.

More specifically, the following methods, for example, are taken: (1) the monomer components (i) including a part of the aromatic vinyl monomer are put in the reactor and the copolymerizing reaction starts, then, monomer components including the rest of the aromatic vinyl monomer and monomer components including the unsaturated dicarboxylic acid derivative are separately added thereto, as the monomer components (ii); (2) the monomer components (i) including a part of the unsaturated dicarboxylic acid derivative as well are put in the reactor and the copolymerizing reaction starts, then, monomer components including the rest of the unsaturated dicarboxylic acid derivative and monomer components including the aromatic vinyl monomer are separately added thereto, as the monomer components (ii); and (3) to the reactive solution, monomer components including all the unsaturated dicarboxylic acid derivative and monomer components including all the aromatic vinyl monomer are separately added, as the monomer components (ii); etc.

By any of these methods, side reactions such as a Diels-Alder reaction between the aromatic vinyl monomer and the unsaturated dicarboxylic acid derivative can be more surely suppressed. As a result, a thermoplastic copolymer wherein a ratio of low-molecular-weight components (described later) is relatively low can be obtained.

Furthermore, it is more preferable that the addition of the aromatic vinyl monomer is finished after addition of the vinyl cyanide monomer is finished. The vinyl monomer (a) may be added at any stage of the copolymerizing reaction, but it is preferable that in the case where the vinyl monomer (a) include the unsaturated carboxylic acid derivative, the unsaturated dicarboxylic acid derivative is added to the reactive solution before the addition of the aromatic vinyl monomer is finished.

It should be noted that if necessary, additives may be added in the copolymerization process. The following are used as additives: a chain transfer agent such as alkyl mercaptan or α-methylstyrene dimer; a weathering agent such as any of hindered amine series and benzotriazol series; an antioxidant such as any of hindered phenol series; a molecular weight modifier; a plasticizer; a heat stabilizer; and a light stabilizer.

In another manufacturing process of the present invention, after the copolymerizing reaction starts, the monomer components (ii) are added to the reactive solution. After the addition of all the monomer components is finished, the unreacted vinyl cyanide monomer is removed therefrom. To be more specific, for example, after all the monomer components are added to the reactive solution, the unreacted vinyl cyanide monomer is removed from the reactive solution so that the weight of the unreacted aromatic vinyl monomer becomes greater than the weight of the unreacted vinyl cyanide monomer in the reactive solution.

In other words, after all the monomer components are put in the reactor, by removing the unreacted vinyl cyanide monomer out of the reactive solution, the weight of the unreacted aromatic vinyl monomer is made greater than the weight of the unreacted vinyl cyanide monomer in the reactive solution. Furthermore, it is particularly preferable that the ratio of the aromatic vinyl monomer is caused to accounts for not less than 60 weight percent in all the unreacted monomers in the reactive solution by removing the unreacted vinyl cyanide monomer form the reactive solution.

The unreacted vinyl cyanide monomer is removed from the reactive solution by, for example: removing a part of the vinyl cyanide monomer at reflux; or, vacuum distillation. Note that a period of time for removing the vinyl cyanide monomer is not particularly limited. The removal of the vinyl cyanide monomer may be started at any time as long as it is after all the monomer components are put in the reactor. Thus, there is no particular limitation on the timing thereof, but it is desirable that the removal is started as early as possible.

The copolymerizing reaction may be finished at a stage where all the monomer components are virtually polymerized, but if necessary, it may be finished at a stage where a part of the aromatic vinyl monomer remains unreacted. In this manner, the thermoplastic copolymer of the present invention is manufactured. The thermoplastic copolymer has various excellent physical properties including good mechanical strength such as high-impact properties, good heat resistance, good chemical resistance, good weathering, and high flowability.

A method for taking the thermoplastic copolymer out of the reactive solution is not particularly limited, but, for example, the following method is useful as being simple: the reactive solution is introduced to a so-called volatile separating device such as a vented twin-screw extruder, where volatile is removed so that the thermoplastic copolymer is separated from the unreacted monomer components, the solvent, and the like. This method utilizing the volatile separating device is industrially advantageous.

Furthermore, another method is available whereby the reactive solution is put in to another solvent which does not solve the thermoplastic copolymer so that the thermoplastic copolymer is precipitated (deposited), and the precipitate thus obtained, that is, the thermoplastic copolymer, is filtered out and dried up.

By doing so, the thermoplastic copolymer of the present invention is separated out. Additives such as the aforementioned antioxidants, the aforementioned weathering agents, fire retardants, antistatic agents, and coloring agents, or various kinds of fillers may be added to the thermoplastic copolymer thus obtained, if necessary.

By the above-described manufacturing method, the thermoplastic copolymer of the present invention can be obtained. The thermoplastic copolymer thus obtained, in the case where the monomer components include the unsaturated dicarboxylic acid derivative and the vinyl monomer (b), preferably includes a residual group of the aromatic vinyl monomer accounting for 5 weight percent to 85 percent, a residual group of the vinyl cyanide monomer accounting for 5 weight percent to 35 weight percent, a residual group of the unsaturated dicarboxylic acid derivative accounting for 10 weight percent to 50 weight percent, and a residual group of the vinyl monomer (b) accounting for 0 weight percent to 20 weight percent. Furthermore, it is particularly preferable that the thermoplastic copolymer includes a residual group of the aromatic vinyl monomer accounting for 15 weight percent to 75 weight percent, a residual group of the vinyl cyanide monomer accounting for 5 weight percent to 25 weight percent, a residual group of the unsaturated dicarboxylic acid derivative accounting for 20 weight percent to 50 weight percent, and a residual group of the vinyl monomer (b) accounting for 0 weight percent to 10 weight percent.

Regarding the thermoplastic copolymer including the residual groups of the monomer components of the above-described respective weight percent ranges, let $YI_1$ be a yellowness index of a 15 weight percent chloroform solution of the thermoplastic copolymer, $YI_2$ be a yellowness index of the 15 weight percent chloroform solution of the thermoplastic copolymer after heated for 4 minutes at 265° C., and X be a weight percent of the residual groups of the unsaturated dicarboxylic acid derivative, the following formulas are satisfied:

$$YI_1 < (1.5 \times X^2 / 100) + 5 \quad (1)$$

and $$YI_2 / YI_1 < 1.5 \quad (2)$$

Herein, it should be noted that the method of heating the thermoplastic copolymer at 265° C. for four minutes is not necessarily as such.

The formulas (1) and (2) were found as a result of earnest study by the inventors of this application. As to the thermoplastic copolymer of the present invention, the formula (1) is satisfied, since it is hard to discolor. On the other hand, as to the conventional thermoplastic copolymers, since they are easy to discolor, the formula (1) is not satisfied. Besides, as to the thermoplastic copolymer of the present invention, a difference between the degrees of discoloration before and after the heat application (namely, a degree of re-discoloration) is relatively small, and hence the formula (2) is satisfied. On the other hand, as to the conventional thermoplastic copolymers, the degree of re-discoloration is relatively great, and hence the formula (2) is not satisfied. Consequently, the thermoplastic copolymer of the present invention has improved discoloration properties as compared with the conventional thermoplastic copolymers. Specifically, it is hard to discolor and the re-discoloration in the molding process is suppressed.

It is desirable that a ratio of low-molecular weight impurities in the thermoplastic copolymer is as low as possible. For example, a ratio of 200 to 1000 molecular-weight components including the residual group of the unsaturated dicarboxylic acid derivative, is preferably as low as possible. To be more specific, the ratio of the low-molecular-weight components is preferably not higher than $(0.1 \times X)$, more preferably not higher than $(0.06 \times X)$, and particularly preferably not higher than $(0.04 \times X)$. In the case where the ratio of the low-molecular-weight components exceeds $(0.1 \times X)$, the heat resistance and the high-impact properties of the thermoplastic copolymer tend to deteriorate. Note that in the manufacturing method of the present invention, the low-molecular-weight components remain in the thermoplastic copolymer, not being removed together with the unreacted vinyl cyanide monomer when they are removed from the reactive solution.

The following description will describe the low-molecular-weight components in more detail. As a result of earnest study by the inventor of the present application, it was found that when the maleimide-series monomer as the unsaturated dicarboxylic acid derivative, the aromatic vinyl monomer, and the vinyl cyanide monomer are radical-polymerized, side reactions such as the Diels-Alder reaction occurs among the three, along with the polymerization. To be more specific, the maleimide-series monomer reacts with the aromatic vinyl monomer and/or the vinyl cyanide monomer. Further, products obtained by such reactions react with the maleimide-series monomer and/or the vinyl cyanide monomer. Thus, low-molecular-weight components including products of such reactions are produced, along with the targeted polymer.

Therefore, the low-molecular-weight components contained in the thermoplastic copolymer are not compounds produced by the radical polymerization of the monomer components, but compounds produced by side reactions such as the Diels-Alder reaction between the unsaturated dicarboxylic acid derivative and, for example, the aromatic vinyl monomer. A molecular weight of the low-molecular-weight components and a content (ratio) of the low-molecular-weight components in the thermoplastic copolymer can be easily measured by GPC (gel permeation chromatography).

For a fuller understanding of other objects, characteristics, and merits of the present invention, reference should be made to the ensuing detailed description. Advantages of the present invention will be also made clear in the ensuing description.

BEST MODE FOR CARRYING OUT THE INVENTION

The present invention will be discussed in more detail with reference to the following examples and comparative examples, but the scope of the present invention is not limited by them. Note that the terms "parts" and "percent" described in the following examples and comparative examples mean "parts by weight" and "weight percent", respectively.

A composition of the thermoplastic copolymer was found by the following method. Namely, a predetermined amount of the thermoplastic copolymer was weighed out, and was taken into chloroform so that a 3-percent solution was obtained. Then, with the use of this solution, infrared spectroscopic analysis (so-called infrared absorption method) was carried out under a condition of cell thickness of 0.05 mm.

Respective amounts of cyano groups, carbonyl groups, and benzene rings contained in the thermoplastic copolymer were derived from a measured absorptive strength of an infrared absorption spectrum (IR), and as a result the composition of the thermoplastic copolymer was found. Note that the cyano groups, originally having belonged to the vinyl cyanide monomer, absorb infrared rays with a wavenumber of 2237 $cm^{-1}$. The carbonyl groups, originally having belonged to the vinyl monomer (a), absorb infrared rays with a wavenumber of 1712 $cm^{-1}$. The benzene rings, originally having belonged to the aromatic vinyl monomer, absorb infrared rays with a wavenumber of 760 $cm^{-1}$.

Respective concentrations of unreacted portions of the monomer components in the reactive solution at a point of time when addition of all the monomer components to the reactive solution was completed, that is, a concentration of the aromatic vinyl monomer, the vinyl cyanide monomer, and the vinyl monomer (a) in the solution at that time, were measured by the use of the gas chromatography (GC). Further, respective concentration of the unreacted monomer components in the reactive solution at a time when the copolymerizing reaction was completed was measured in the same manner. Note that the concentration of the thermoplastic copolymer in the reactive solution when the copolymerizing reaction was ended was derived from the amount of the thermoplastic copolymer separated out from the reactive solution.

A glassy-transition temperature (Tg) of the thermoplastic copolymer was derived by the middle point method from a DSC (differential scanning calorimetry) curve which was measured with $\alpha$-$Al_2O_3$ as standard substance, in a nitrogen atmosphere and at a temperature rising speed of 5° C. per minute, by the use of a DSC device (manufactured by Rigaku Corporation, trade name: DSC-8230).

Furthermore, the yellowness index (YI) of the thermoplastic copolymer was measured as follows: 15 percent chloroform solution of the thermoplastic copolymer was used as a sample with a 1-cm-long cell, and the measurement by transmittance was carried out by the use of a color difference meter (manufactured by Nihon Denshoku Kogyo K.K., trade name: SZ-Σ80 COLOR MEASURING SYSTEM).

EXAMPLE 1

5.0 parts of styrene as the aromatic vinyl monomer, 5.0 parts of acrylonitrile as the vinyl cyanide monomer, and 47.3 parts of toluene as the solvent were put in a reactor equipped with a thermometer, a nitrogen gas introducing tube, two dropping devices, a reflux condenser, and an agitator.

A mixture (A) composed of 15.0 parts of styrene and 0.2 part of an polymerization initiator (produced by Kayaku Akzo Corporation, trade name: KAYACARBON BIC-75) was put in one of the dropping devices, while a mixture (B) composed of 1.0 part of acrylonitrile, 16.0 parts of N-phenyl maleimide as the unsaturated dicarboxylic acid derivative (vinyl monomer (a)), and 10.7 parts of toluene was put in the other dropping device. The mixture (B) was prepared by mixing acrylonitrile and N-phenyl maleimide into toluene and heating the obtained solution to 70° C. so as to solve the above two.

Then, after the toluene solution was heated to 100° C. in a nitrogen atmosphere with stirring, 0.05 part of the polymerization initiator (same) was added to the toluene solution so that the copolymerizing reaction started. After the copolymerizing reaction started, the mixture (A) was continuously added dropwise to the reactive solution over 3.5 hours, while the mixture (B) whose temperature was kept at 70° C. was also continuously added dropwise thereto over 3.0 hours.

Respective concentration of unreacted monomer components in the reactive solution at a time when all the monomer components were put in the reactor, that is, at a time when the dropping of the mixture (A) was finished, was measured. As a result, concentrations of styrene, acrylonitrile, and N-phenyl maleimide were 3.2 percent, 1.6 percent, and 0.5 percent, respectively. Therefore, unreacted styrene accounted for 60.4 percent of the unreacted monomer components in the reactive solution.

The copolymerizing reaction was ended 9 hours after the commencement thereof. The reactive solution obtained as a result was introduced into a vented twin-screw extruder. A pressure was lowered to a predetermined level, while the reactive solution was heated to 280° C., so that volatile components such as the solvent were removed from the reactive solution. Thus, a thermoplastic copolymer was obtained in a pellet form. The glassy-transition temperature of the thermoplastic copolymer was 165° C.

Then, a composition of the thermoplastic copolymer was checked. It was found that the thermoplastic copolymer was composed of 47 percent of a residual group of a styrene (a residual group of the aromatic vinyl monomer), 14 percent of a residual group of an acrylonitrile (a residual group of the vinyl cyanide monomer), and 39 percent (X=39) of a residual group of the N-phenyl maleimide (a residual group of the unsaturated dicarboxylic acid derivative). A concentration of the thermoplastic copolymer in the reactive solution was 41.5 percent. Furthermore, respective concentrations of unreacted monomer components in a filtrate, that is, a concentration of the unreacted monomer components in the reactive solution at the time when the copolymerizing reaction was ended, was measured. As a result, concentrations of styrene and acrylonitrile were 0.1 percent and 0.3 percent, respectively, whereas N-phenyl maleimide was not detected.

Furthermore, a content (ratio) of low-molecular-weight components in the thermoplastic copolymer was measured by GPC with tetrahydrofuran (THF) as liberating liquid. As a molecular weight, a value calculated by the standard polystyrene conversion was used. A calibration curve was worked out by using a sample resulting on addition of a known amount of low-molecular-weight components to a thermoplastic copolymer which contained no low-molecular-weight components.

As a result, the content of the low-molecular-weight components, derived from a ratio of a planar dimension of the low-molecular-weight components to a planar dimension of the thermoplastic copolymer, was 1.0 percent. The low-molecular-weight components were separated out by GPC with THF as liberating liquid, and they were condensed and dried up. An infrared absorption spectrum (IR), a $^1$H-NMR (nuclear magnetic resonance) spectrum, and a $^{13}$C-NMR spectrum of the obtained low-molecular-weight components were measured, and as a result it was ascertained that the low-molecular-weight components contained a residual group of an N-phenyl maleimide as the residual group of the unsaturated dicarboxylic acid derivative. Since X was 39, 0.1×X was 3.9. Therefore, the content (1.0 percent) of the low-molecular -weight components was within a preferable range.

Next, the yellowness indexes $YI_1$ and $YI_2$ were measured. As a result, $YI_1$, $YI_2$, and $YI_2/YI_1$ were found to be 25.0, 33.0, and 1.32, respectively. Since X was 39, $(1.5 \times X^2/100)+5$ was 27.8. Therefore, it was found that the thermoplastic copolymer satisfied the above-described formulas (1) and (2). The major reaction conditions and results as described above were shown all together in Table 1.

EXAMPLE 2

A thermoplastic copolymer was obtained by the same copolymerizing reaction and operations as those in Example 1 except that the mixture (B) was continuously added dropwise over 2.0 hours. The thermoplastic copolymer had a glassy-transition temperature of 165° C.

At a time when the dropping of the mixture (A) finished, concentrations of unreacted portions of styrene, acrylonitrile, and N-phenyl maleimide in a reactive solution were 4.0 percent, 1.8 percent, and 0.1 percent, respectively. Therefore, the unreacted styrene accounted for 67.8 percent of the unreacted monomer components in the reactive solution. Besides, concentrations of styrene and acrylonitrile at a time when the copolymerizing reaction finished were 0.4 percent and 0.2 percent, respectively, whereas N-phenyl maleimide was not detected.

Furthermore, it was found that the thermoplastic copolymer was composed of 47 percent of a residual group of styrene, 14 percent of a residual group of acrylonitrile, and 39 percent (X=39) of a residual group of N-phenyl maleimide. A concentration of the thermoplastic copolymer in the reactive solution was 41.3 percent.

The content of the low-molecular-weight components, measured in the same manner as in Example 1, was 1.0 percent. Besides, it was ascertained that the low-molecular-weight components contained an N-phenyl maleimide. Since X was 39, 0.1×X was 3.9. Therefore, the content (1.0 percent) of the low-molecular-weight components was within a preferable range.

Next, the yellowness indexes $YI_1$ and $YI_2$ were measured. As a result, $YI_1$, $YI_2$, and $YI_2/YI_1$ were found to be 13.0, 17.0, and 1.31, respectively. Since X was 39, $(1.5 \times X^2/100)+5$ was 27.8. Therefore, it was found that the thermoplastic copolymer satisfied the above-described formulas (1) and (2). The major reaction conditions and results as described above were shown all together in Table 1.

EXAMPLE 3

The monomer components were put into the reactor by carrying out the same operations as those in Example 1 except that the mixture (B) was continuously added dropwise over 3.5 hours, that is, a period of time spent for adding dropwise the mixture (A) and that spent for adding dropwise the mixture (B) were made equal.

At a time when all the monomer components were put in the reactor, that is, when the dropwise addition of the mixture (A) and the mixture (B) was finished, concentrations of unreacted styrene, acrylonitrile, and N-phenyl maleimide in a reactive solution were 3.2 percent, 1.7 percent, and 1.7 percent, respectively. Therefore, the unreacted styrene accounted for 48.5 percent of the unreacted monomer components in the reactive solution.

Then, when all the monomer components were put in the reactor, an operation for removing a part of the reactive solution was started. To be more specific, 10 parts of a refluxed liquid resulting on concentration by the reflux condenser was removed therefrom. At a time when the removal of 10 parts of the refluxed liquid was carried out, concentrations of unreacted styrene, acrylonitrile, and N-phenyl maleimide in a reactive solution were 3.5 percent, 0.7 percent, and 0.9 percent, respectively. Therefore, the unreacted styrene accounted for 68.6 percent of the unreacted monomer components in the reactive solution.

The copolymerizing reaction was ended 9 hours after the commencement thereof. Then, by carrying out the same operations as those in Example 1, a thermoplastic copolymer was separated out. The glassy-transition temperature of the thermoplastic copolymer was 166° C.

Then, a composition of the thermoplastic copolymer was checked. As a result, it was found that the thermoplastic copolymer was composed of 47 percent of a residual group of styrene, 13 percent of a residual group of acrylonitrile, and 40 percent (X=40) of a residual group of N-phenyl maleimide. A concentration of the thermoplastic copolymer in the reactive solution was 45.2 percent. Further, concentrations of unreacted monomer components in the reactive solution at the time when the copolymerizing reaction was ended were measured. As a result, concentrations of styrene, and acrylonitrile were found to be 0.3 percent and 0.1 percent, respectively, whereas N-phenyl maleimide was not detected.

A content of low-molecular-weight components, measured in the same manner as in Example 1, was 1.1 percent. Besides, it was ascertained that the low-molecular-weight components contained a residual group of N-phenyl maleimide. Since X was 40, 0.1×X was 4.0. Therefore, the content (1.1 percent) of the low-molecular-weight components was within a preferable range.

Next, the yellowness indexes $YI_1$ and $YI_2$ were measured. As a result, $YI_1$, $YI_2$, and $YI_2/YI_1$ were found to be 16.0, 22.0, and 1.38, respectively. Since X was 40, $(1.5 \times X^2/100)+5$ was 29.0. Therefore, it was found that the thermoplastic copolymer of this example satisfied the above-described formulas (1) and (2). The major reaction conditions and results as described above were shown all together in Table 1.

COMPARATIVE EXAMPLE 1

A thermoplastic copolymer for comparison was obtained by carrying out the same copolymerizing reaction and operations as those in Example 1 except that the mixture (B) was continuously added dropwise over 3.5 hours, that is, a period of time spent for adding dropwise the mixture (A) and that spent for adding dropwise the mixture (B) were made equal. A glassy-transition temperature of the comparative thermoplastic copolymer was 164° C.

At a time when the dropwise addition of the mixture (A) and the mixture (B) finished, concentrations of unreacted styrene, acrylonitrile, and N-phenyl maleimide in a reactive solution were 3.2 percent, 1.7 percent, and 1.7 percent, respectively. Therefore, the unreacted styrene accounted for 48.5 percent of the unreacted monomer components in the reactive solution. Besides, at the time when the copolymerizing reaction finished, concentrations of unreacted styrene and acrylonitrile in the reactive solution were found to be 0.1 percent and 0.4 percent, respectively, whereas N-phenyl maleimide was not detected.

In addition, it was found that the thermoplastic copolymer was composed of 49 percent of a residual group of styrene, 13 percent of a residual group of acrylonitrile, and 38 percent (X=38) of a residual group of N-phenyl maleimide. A concentration of the thermoplastic copolymer in the reactive solution was 41.5 percent.

A content of low-molecular-weight components, measured in the same manner as in Example 1, was 1.1 percent. Besides, it was ascertained that the low-molecular-weight components contained an N-phenyl maleimide residue. Since X was 38, 0.1×X was 3.8. Therefore, the content (1.1 percent) of the low-molecular-weight components was within a preferable range.

Next, the yellowness indexes $YI_1$ and $YI_2$ were measured. As a result, $YI_1$, $YI_2$, and $YI_2/YI_1$ were found to be 30.0, 52.0, and 1.73, respectively. Since X was 38, $(1.5 \times X^2/100)+5$ was about 26.7. Therefore, it was found that the comparative thermoplastic copolymer did not satisfy the above-described formulas (1) and (2). Besides, it was also found that the comparative thermoplastic copolymer was easier to discolor and had a greater degree of re-discoloration, as compared with the thermoplastic copolymer of Example 1. The major reaction conditions and results as described above were shown all together in Table 1.

COMPARATIVE EXAMPLE 2

5.0 parts of styrene, 5.0 parts of acrylonitrile, and 47.3 parts of toluene were put in the same reactor as that used in Example 1. 0.2 part of an polymerization initiator (produced by Kayaku Akzo Corporation, trade name: KAYACARBON BIC-75) as an equivalent to a mixture (A) was put in one of the dropping devices, while a mixture (B) composed of 15.0 parts of styrene, 1.0 part of acrylonitrile, 16.0 parts of N-phenyl maleimide, and 10.7 parts of toluene was put in the other dropping device. The mixture (B) was prepared by mixing styrene, acrylonitrile and N-phenyl maleimide into toluene and heating the obtained solution to 70° C. so as to solve the above three.

Then, after the toluene solution was heated to 100° C. in a nitrogen atmosphere with stirring, 0.05 part of the polymerization initiator (same) was added to the toluene solution so that the copolymerizing reaction started. After the copolymerizing reaction started, the mixture (A) was continuously added dropwise to the reactive solution over 3.5 hours, while the mixture (B) whose temperature was kept at 70° C. was also continuously added dropwise thereto over 3.5 hours.

In other words, the thermoplastic copolymer for comparison was obtained by carrying out the same copolymerizing reaction and operations as those in Example 1 except that compositions of the mixtures (A) and (B) were changed as described above, and that a period of time spent for adding dropwise the mixture (A) and that spent for adding dropwise the mixture (B) were made equal. A glassy-transition temperature of the comparative thermoplastic copolymer was 152° C.

At a time when the dropping of the mixtures (A) and (B) was finished, concentrations of unreacted styrene, acrylonitrile, and N-phenyl maleimide in the reactive solution were 3.1 percent, 1.8 percent, and 1.7 percent, respectively. Therefore, unreacted styrene accounted for 47.0 percent of the unreacted monomer components in the reactive solution. Besides, a concentration of the unreacted styrene and acrylonitrile in the reactive solution at the time when the copolymerizing reaction was ended were 0.1 percent and 0.4 percent, respectively, whereas N-phenyl maleimide was not detected.

Then, it was found that the thermoplastic copolymer was composed of 49 percent of a residual group of styrene, 13 percent of a residual group of acrylonitrile, and 38 percent (X=38) of a residual group of N-phenyl maleimide. A concentration of the thermoplastic copolymer in the reactive solution was 41.5 percent.

A content (ratio) of low-molecular-weight components in the thermoplastic copolymer, measured by the same method as that in Example 1, was 5.3 percent. Also it was ascertained that the low-molecular-weight components contained a residual group of N-phenyl maleimide. Since X was 38, 0.1×X was 3.8. Therefore, it was found that the content (5.3 percent) of the low-molecular-weight components was not within a preferable range. In other words, this thermoplastic copolymer contained more low-molecular-weight components, as compared with the thermoplastic copolymer of Example 1. For this reason, the glassy-transition temperature of the thermoplastic copolymer of Comparative Example 2 was lower than that of the thermoplastic copolymer of Example 1.

Next, the yellowness indexes $YI_1$ and $YI_2$ were measured. As a result, $YI_1$, $YI_2$, and $YI_2/YI_1$ were found to be 32.0, 54.0, and 1.69, respectively. Since X was 38, $(1.5 \times X^2/100)+5$ was 26.7. Therefore, it was found that the above comparative thermoplastic copolymer did not satisfy the above-described formulas (1) and (2). Besides, it was also found that the comparative thermoplastic copolymer was easier to discolor and had a greater degree of re-discoloration, as compared with the thermoplastic copolymer of Example 1. The major reaction conditions and results as described above were shown all together in Table 1.

TABLE 1

| | | EXAMPLE 1 | EXAMPLE 2 | EXAMPLE 3 | | COMP. EX. 1 | COMP. EX. 2 |
|---|---|---|---|---|---|---|---|
| DROPPING TIME (hr) | MIXTURE (A)*[1] | 3.5 | 3.5 | 3.5 | | 3.5 | 3.5 |
| | MIXTURE (B)*[2] | 3.0 | 2.5 | 3.5 | | 3.8 | 3.5 |
| CONCENTRATION OF UNREACTED MONOMER | STYRENE | 3.2 | 4.0 | BEFORE REMOVAL 3.2 | AFTER REMOVAL 3.5 | 3.2 | 3.1 |
| | ACRYLONITRILE | 1.6 | 1.8 | 1.7 | 0.7 | 1.7 | 1.8 |

TABLE 1-continued

|  |  | EXAMPLE 1 | EXAMPLE 2 | EXAMPLE 3 |  | COMP. EX. 1 | COMP. EX. 2 |
|---|---|---|---|---|---|---|---|
| COMPONENTS WHEN DROPPING FINISHED (WEIGHT PERCENT) | N-PHENYL MALEIMIDE | 0.5 | 0.1 | 1.7 | 0.9 | 1.7 | 1.7 |
|  | RATIO OF STYRENE | 60.4 | 67.8 | 48.5 | 68.6 | 48.5 | 47.0 |
| CONCENTRATION OF UNREACTED MONOMER COMPONENTS WHEN REACTION FINISHED (WEIGHT PERCENT) | STYRENE | 0.1 | 0.4 | 0.3 |  | 0.1 | 0.1 |
|  | ACRYLONITRILE | 0.3 | 0.2 | 0.1 |  | 0.4 | 0.4 |
|  | N-PHENYL MALEIMIDE | NOT DETECTED | NOT DETECTED | NOT DETECTED |  | NOT DETECTED | NOT DETECTED |
| CONCENTRATION OF THERMOPLASTIC COPOLYMER (WEIGHT PERCENT) |  | 41.5 | 41.3 | 45.2 |  | 41.5 | 41.5 |
| COMPOSITION OF THERMOPLASTIC COPOLYMER (WEIGHT PERCENT) | STYRENE | 47 | 47 | 47 |  | 49 | 49 |
|  | ACRYLONITRILE | 14 | 14 | 13 |  | 13 | 13 |
|  | N-PHENYL MALEIMIDE | 39 | 39 | 40 |  | 38 | 38 |
| LOW-MOLECULAR-WEIGHT COMPONENTS (WEIGHT PERCENT) |  | 1.0 | 1.0 | 1.1 |  | 1.1 | 5.3 |
| $0.1 \times x$ |  | 3.9 | 3.9 | 4.0 |  | 3.8 | 3.8 |
| GLASSY-TRANSITION TEMPERATURE Tg (° C.) |  | 165 | 165 | 166 |  | 164 | 152 |
| Yellowness index | $YI_1$ | 25.5 | 13.0 | 16.2 |  | 30.0 | 32.0 |
|  | $YI_2$ | 33.0 | 17.0 | 22.0 |  | 52.0 | 54.0 |
| $YI_2/YI_1$ |  | 1.32 | 1.31 | 1.38 |  | 1.73 | 1.69 |
| $(1.5 \times X^2/100) + 5$ |  | 27.8 | 27.8 | 29.0 |  | 26.7 | 26.7 |

*[1]Mixture (A) includes styrene (aromatic vinyl monomer) (except for the Comparative Example 2.)
*[2]Mixture (B) includes acrylonitrile (vinyl cyanide monomer) and N-phenyl maleimide (unsaturated dicarboxylic acid derivative).

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

Industrial Applicability

The thermoplastic copolymer of the present invention has excellent physical properties such as high heat-resistance and high mechanical strength, and is hard to discolor. The thermoplastic copolymer is suitable for interior parts of automobiles, parts of electric and electronic appliances, parts of industrial products, moldings used in business and office machines, and food wrapping materials. It should be noted that methods for molding the thermoplastic copolymer and use thereof are not particularly limited.

What is claimed is:

1. A thermoplastic copolymer containing a residual group of an aromatic vinyl monomer in a range of 5 weight percent to 85 weight percent, a residual group of a vinyl cyanide monomer in a range of 5 weight percent to 35 weight percent, a residual group of a maleimide in a range of 10 weight percent to 50 weight percent, and a residual group of a vinyl monomer (b) copolymerizable with the above three monomers in a range of 0 weight percent to 20 weight percent, wherein said thermoplastic copolymer satisfies:

$$YI_1 < (1.5 \times X^2/100) + 5;$$

and $$YI_2/YI_1 < 1.5$$

where $YI_1$ is a yellowness index of a 15 weight percent chloroform solution of said thermoplastic copolymer, $YI_2$ is a yellowness index of a 15 weight percent chloroform solution of said thermoplastic copolymer after heated at 265° C. for four minuets, and X is a weight percent of the residual group of the maleimide.

2. The thermoplastic copolymer as set forth in claim 1, wherein the residual group of the aromatic vinyl monomer accounts for 15 weight percent to 75 weight percent, the residual group of the vinyl cyanide monomer accounts for 5 weight percent to 25 weight percent, the residual group of the a maleimide accounts for 20 weight percent to 50 weight percent, and the residual group of the vinyl monomer (b) accounts for 0 weight percent to 10 weight percent.

3. The thermoplastic copolymer as set forth in claim 1, wherein a ratio of low-molecular-weight components containing the residual group of the maleimide is not more than (0.1×X).

* * * * *